United States Patent Office 3,364,227
Patented Jan. 16, 1968

3,364,227
POLYMETHYLENEPYRAZOLES
Richard A. Robinson, Evanston, Ill., assignor to G. D. Searle & Co., Chicago, Ill., a corporation of Delaware
No Drawing. Filed Oct. 21, 1965, Ser. No. 500,371
7 Claims. (Cl. 260—310)

The present invention relates to a group of compounds in which a large cycloalkane ring is fused to a pyrazole ring. More particularly, the present invention relates to a group of compounds having the following structural formulas

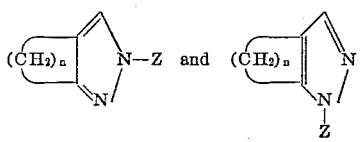

wherein $n$ is a whole number between 10 and 13 inclusive; and Z is selected from the group consisting of hydrogen, phenyl, and halophenyl. The halophenyl radicals referred to above include fluorophenyl, chlorophenyl, bromophenyl, and iodophenyl.

Also encompassed by the present invention are salts of the above compounds. Thus, the compounds indicated above form non-toxic salts with a variety of inorganic and strong organic acids. That is, they form salts with sulfuric, phosphoric, hydrochloric, hydrobromic, sulfamic, citric, lactic, maleic, malic, succinic, tartaric, cinnamic, acetic, benzoic, gluconic, and related acids.

The compounds of this invention are useful because of their pharmacological properties. In particular, they possess anti-inflammatory activity which is demonstrated by a phenylbutazone-like effect on edematous conditions. The present compounds also inhibit the growth of algae such as *Chlorella vulgaris* and they inhibit germination of seeds of Trifolium.

The compounds of the present invention are conveniently prepared by the reaction of the appropriate 2-formylcycloalkanone with a hydrazine. The reaction is ordinarily carried out at reflux temperature in an inert solvent such as 2-propanol.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (° C.).

Chemical shifts in NMR spectra, reported in cycles per second (c.p.s.), are shifts to lower fields than the signal of tetramethylsilane which is used as an internal reference. A 10% solution of the compound in deuterochloroform is used for the spectra.

Example 1

A mixture of 18 grams of cyclododecanone, 250 ml. of benzene, and 10 grams of sodium methoxide is stirred for 1 hour at room temperature. 15 ml. of ethyl formate is then added and stirring is continued for 5 hours. The solid which precipitates is the sodium salt of the desired product. It is collected by filtration, washed with ether, and then dissolved in water. The aqueous solution is made acidic by the addition of acetic acid and the resultant mixture is extracted with ether. Evaporation of the ether solvent from the combined extracts gives an oil which is 2-formylcyclododecanone.

The above procedure is repeated using 17 grams of cyclopentadecanone, 8 grams of sodium methoxide, and 10 grams of ethyl formate to give 2-formylcyclopentadecanone.

Example 2

A mixture of 11 grams of 2-formylcyclododecanone, 9 grams of phenylhydrazine, and 100 ml. of 2-propanol is refluxed for 1 hour. The solvent is then removed by distillation under reduced pressure and the residue is distilled through a short-path still to give crude material boiling at about 140° C. at 0.01 mm. pressure. The resultant distillate is dissolved in hexane and chromatographed on a neutral alumina column. The column is first eluted with hexane and the solvent is evaporated from the eluate thus obtained. The resultant residue is 1-phenyl-3,4-decamethylene-1H-pyrazole. If hydrogen chloride gas is bubbled through an ether solution of this compound, the corresponding hydrochloride salt precipitates out. It melts at about 143–144° C. NMR spectra of these two materials at 60 mc. show an absorption peak at 153 c.p.s. for the free base and at 179 c.p.s. for the salt. These peaks are attributable to the methylene group attached to the 3-position of the pyrazole ring. The free base has the following formula

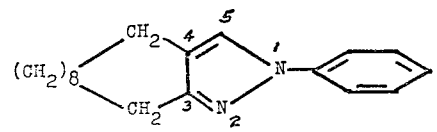

Further elution of the chromatographic column described above with 0.5% ethyl acetate in hexane gives a second eluate. The solvent is evaporated from this eluate and the residue is dissolved in ether. Hydrogen chloride gas is passed through the ether solution and the solid which precipitates is collected to give 1-phenyl-4,5-decamethylene-1H-pyrazole hydrochloride melting at about 146–147° C. The resultant salt is dissolved in water and the solution is made alkaline by the addition of sodium hydroxide solution. The solid thus obtained is the corresponding free base and it melts at about 58–60° C. NMR spectra of the free base and the salt at 60 mc. show absorption peaks at 155 c.p.s. and 160 c.p.s. respectively. These peaks are attributable to the methylene group attached to the 5-position of the pyrazole ring. The free base has the following formula

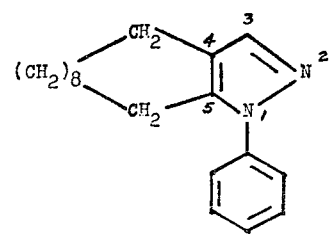

Example 3

2-formylcyclopentadecanone is reacted with phenylhydrazine according to the procedure described in Example 2. The resultant mixture is separated by chromatography in the manner described in Example 2. The product obtained from hexane elution is 1-phenyl-3,4-tridecamethylene-1H-pyrazole. This compound is an oil. NMR spectra were taken of this product and the corresponding hydrochloride salt at 60 mc. The free base shows an absorption at 153 c.p.s. while the corresponding hydrochloride shows a corresponding absorption at 181 c.p.s. This absorption is attributable to the methylene group attached to the 3-position of the pyrazole ring.

1-phenyl-4,5-tridecamethylene-1H-pyrazole is obtained from elution of the chromatographic column with 0.5% ethyl acetate in hexane. This compound melts at about 52° C. Nuclear magnetic resonance spectra of this base and the corresponding hydrochloride at 60 mc. show absorption maxima at 150 c.p.s. for the free base and 153 c.p.s. for the hydrochloride. In both cases, this absorption is attributable to the methylene attached to the 5-position of the pyrazole ring.

Example 4

2-formylcyclododecanone is reacted with 4-fluorophenylhydrazine according to the procedure described in Example 2. The crude product is subjected to chromatography in the manner described in Example 2. The first product obtained is 1-(4-fluorophenyl)-3,4-decamethylene-1H-pyrazole. It melts at about 67–68° C. and shows an ultraviolet absorption maximum at 265 mμ.

The second product obtained from the chromatography is 1 - (4-fluorophenyl)-4,5-decamethylene-1H-pyrazole. This compound melts at about 61–62° C. and has an ultraviolet absorption maximum at 240 mμ.

Example 5

2-formylcyclopentadecanone is reacted with 4-fluorophenylhydrazine according to the procedure described in Example 2. Purification of the crude product by chromatography, as described in Example 2, gives two products. The first product is 1-(4-fluorophenyl)-3,4-tridecamethylene-1H-pyrazole. It melts at about 61–63° C. and has an ultraviolet maximum at 264 mμ. The second product isolated from chromatography is 1-(4-fluorophenyl) - 4,5-tridecamethylene-1H-pyrazole. It melts at about 48–49° C. and has an ultraviolet maximum at 240 mμ.

Example 6

4 - chlorophenylhydrazine is reacted with 2-formylcyclododecanone according to the procedure described in Example 2 to give 1-(4-chlorophenyl)-3,4-decamethylene-1H-pyrazole and 1-(4-chlorophenyl)-4,5-decamethylene-1H-pyrazole.

Example 7

An equivalent quantity of hydrazine is substituted for the phenylhydrazine and the procedure of Example 2 is repeated. Evaporation of the solvent from the reaction mixture leaves a crystalline residue which melts at about 86–87° C. It has an ultraviolet maximum at 224 mμ. This product is 4,5-decamethylene-1H-pyrazole and it has the following formula

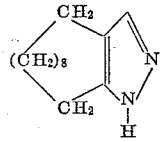

What is claimed is:
1. A compound selected from the group consisting of compounds having structural formulas A and B

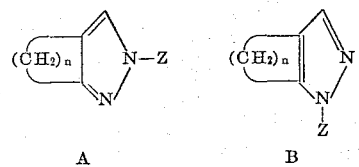

A          B wherein $n$ is a whole number between 10 and 13 inclusive; and Z is selected from the group consisting of hydrogen, phenyl, and halophenyl.

2. A compound of the formula

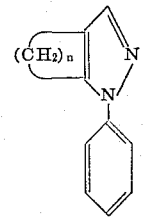

wherein $n$ is a whole number between 10 and 13 inclusive.
3. 1-phenyl-4,5-decamethylene-1H-pyrazole.
4. 1-phenyl-4,5-tridecamethylene-1H-pyrazole.
5. A compound of the formula

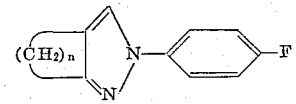

wherein $n$ is a whole number between 10 and 13 inclusive.
6. 1-(4-fluorophenyl)-3,4-decamethylene-1H-pyrazole.
7. 1-(4-fluorophenyl)-4,5-decamethylene-1H-pyrazole.

References Cited

UNITED STATES PATENTS 2,725,384   11/1955   Burness _____ 260—310
2,931,814   4/1960   Karmas _____ 260—310

OTHER REFERENCES

Bredereck et al.: Chem. Ber., vol. 86, page 88 relied on (1953).

Buchta et al.: Chem. Abst., vol. 51, columns 10466–8 (1957).

Ring-Index Supplement I to the second edition, pages 46–47, Wash., D.C., Amer. Chem. Soc., 1963.

Ziegler et al.: Liebigs Ann. Chem., vol. 589, pages 122–3 and 143–4 (1954).

JOHN D. RANDOLPH, *Primary Examiner.*

N. TROUSOF, *Assistant Examiner.*